United States Patent Office 3,332,976
Patented July 25, 1967

3,332,976
1,1,2,2-TETRAHALOETHYL ALKANETHIOL-
SULFONATES
Bernard Freedman, Richmond, Calif., assignor to Chevron
Research Company, a corporation of Delaware
No Drawing. Filed Apr. 1, 1965, Ser. No. 444,776
5 Claims. (Cl. 260—453)

ABSTRACT OF THE DISCLOSURE 1,1,2,2-tetrahaloethyl alkanethiolsulfonates in which the alkyl group contains 1 to 4 carbon atoms such as 1,1,2,2-tetrachloroethyl methanethiolsulfonate. These thiolsulfonates are useful as fungicides.

---

This invention is directed to a unique group of thiolsulfonate compounds and methods for their use. More particularly, this invention relates to S-(1,1,2,2,-tetrahaloethyl) alkanethiolsulfonates which are of particular use as fungicides.

The thiolsulfonate group, —$SO_2S$—, has found application in a number of compounds for the control of pests. Compounds containing this group bonded to a trichloromethyl functionality have been considered as having excellent fungicidal activity. Among the trichloromethyl thiolsulfonates reported are the carboxybenzene and alkane derivatives. Other halogenated thiolsulfonates reported as having biocidal properties are the mono-, di- and trihaloallyl methanethiolsulfonates.

It has now been found that S-(1,1,2,2-tetrahaloethyl) alkanethiosulfonates exhibit significantly greater fungicidal effectiveness over the previously reported thiolsulfonates. Particularly, these novel compounds displayed significantly superior effectiveness over the most closely related known compounds, the trichloromethyl alkanethiolsulfonates. The remarkably active compounds of this invention have the formula:

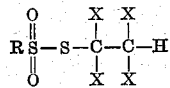

wherein R is alkyl of from 1 to 4 carbons and X is halogen of atomic number 17 to 35. X as chlorine is preferred.

The specific compounds within the preferred group are S - (1,1,2,2-tetrachloroethyl)methanethiolsulfonate, S-(1,1,2,2-tetrachloroethyl)ethanethiolsulfonate, S-(1,1,2,2-tetrachloroethyl)propanethiolsulfonate and S-(1,1,2,2-tetrachloroethyl)butanethiolsulfonate.

The following examples illustrate the compounds of this invention and their method of preparation:

Example 1

Into a flask were charged 47.1 g. methyl disulfide and 60.05 g. glacial acetic acid. This mixture was cooled to 23–32° F. and stirred continuously while 106.4 g. chlorine were added over a 1½ hour period. After addition of the chlorine the mixture was stirred for an additional ½ hour at 32° F., warmed to ambient temperatures and stirred for another ½ hour. The mixture was then cooled to 23° F. and 211.0 g. of 1,1,2,2-tetrachloroethyl sulfenyl chloride were added as rapidly as possible while maintaining this temperature. 36.0 g. of water were added dropwise with vigorous agitation over ½ hour at 23–32° F. followed by ¾ hour stirring at 32° F. and 3 hours stirring as the temperature was allowed to rise to ambient temperatures. The mixture was then stripped under vacuum to 160–170° F. leaving a residue of crude 1,1,2,2-tetrachloroethyl methanethiolsulfonate. This crude product was analyzed by gas liquid chromatography, and the crude yield was determined as 99.4%, based on 1,1,2,2-tetrachloroethyl sulfenyl chloride.

The crude product was purified by dissolving 39.0 g. of the crude product in 120 cc. mixed hexanes and 40 cc. isopropyl alcohol. This solution was stirred briefly at 50° C. then cooled to −15° C., adding a seed crystal at 20° C. The mixture was filtered and dried overnight yielding 29.8 g. of white crystals. M.P. 44.5–46° C.; B.P. 110–113° C. at 0.05 mm. Hg; percent Cl calcd. 51.00; found 48.80; percent S calcd. 23.03, found 21.30.

Example 2

To a flask were charged 61.1 g. ethyl disulfide and 60.05 glacial acetic acid. The contents were cooled to 23–32° F. and stirred continuously while 106.4 g. chlorine were added over a 1½ hour period. After the chlorine addition, stirring was continued for ½ hour at 32° F., the temperature was allowed to rise to ambient temperature with additional stirring for ½ hour at ambient temperatures. The mixture was then again cooled to 23° F. and 211.0 g. 1,1,2,2-tetrachloroethyl sulfenyl chloride was added as rapidly as possible while maintaining this temperature. 36.0 g. water were added dropwise over 30 minutes at 23–32° F., with vigorous agitation. After the water was completely added, stirring was continued for ½ hour at 30° F. and for 2½ hours as the temperature was allowed to rise to ambient temperature. The mixture was then stripped under vacuum to 160° F. leaving 267.7 g. of a clear, pale yellow oil.

To the 267.7 g. of clear, pale yellow oil were added 670 cc. mixed hexanes and 30 cc. isopropyl alcohol and the solution was stirred briefly at 120° F. The temperature was reduced to 70° F. and a seed crystal was added, initiating crystallization. The temperature was then reduced to 5° F. and 15 minutes later the cold slurry was filtered. The filter cake was washed with 100 cc. hexanes at 5° F. The cake was dried overnight leaving 206 g. of white, crystalline 1,1,2,2-tetrachloroethyl ethanethiolsulfonate. M.P. 40–41.5° C.; B.P. ~126° C. at 0.4 mm. Hg; percent Cl calcd. 48.60, found 47.90; percent S calcd. 21.95, found 21.40.

Example 3

In a method similar to those described in Examples 1 and 2, 1,1,2,2-tetrachloroethyl butanethiolsulfonate was prepared. The compound prepared was found to have 44.9 wt. percent Cl and 20.65 wt. percent S.

The novel compounds of this invention were tested for fungicidal activity by means of the "Mycelial Drop Test." To verify the surprisingly greater activity of the invention compounds over previously disclosed compounds, the most closely related of the known compounds, trichloromethyl methanethiolsulfonate, was tested under identical conditions.

The Mycelial Drop Test is designed to measure the fungitoxic activity of fungicidal chemicals in terms of their degree of inhibition upon mycelial growth. Each fungitoxic compound to be tested was dissolved in acetone in dilutions as indicated in Table I. Paper discs previously inoculated by impregnation with equal amounts of particular fungus mycelium and placed on potato dextrose agar medium were tested by applying a precise and equal volume of each of these fungicidal solutions to their center. Following treatment with the fungitoxic chemical, the discs were incubated along with inoculated but untreated control discs at ambient temperatures until such time that these untreated control discs were filled with mycelial growth. Activity of the fungitoxic chemical tested was determined by comparative measurements of radii of mycelial growth away from the edge of the disc in treated and untreated samples. From this comparison a percent inhibition of growth area can be determined. The results of this test on the particular fungus mycelium indicated are shown in Table I.

In summary, the foregoing data clearly show that the unique compounds of this invention possess fungicidal activity which is significantly greater than that of their near-

TABLE I

| Compound | Pythium Ultimum | | Rhizoctonia Solani | | Verticillium Albo-atrum | | Penicillium Italicum | |
|---|---|---|---|---|---|---|---|---|
| | P.p.m. | Control, percent | P.p.m. | Control, percent | P.p.m. | Control, percent | P.p.m. | Control, percent |
| $CH_3S-\overset{O}{\underset{O}{\overset{\parallel}{S}}}-\overset{Cl}{\underset{Cl}{\overset{|}{C}}}-\overset{Cl}{\underset{Cl}{\overset{|}{C}}}-H$ | 250<br>125<br>62 | 100<br>100<br>100 | 250<br>125<br>62 | 100<br>98<br>94 | 250<br>125<br>62.5 | 100<br>100<br>100 | 250<br>125<br>62 | 85<br>51<br>20 |
| $C_2H_5S-\overset{O}{\underset{O}{\overset{\parallel}{S}}}-\overset{Cl}{\underset{Cl}{\overset{|}{C}}}-\overset{Cl}{\underset{Cl}{\overset{|}{C}}}-H$ | 250<br>125<br>62 | 100<br>100<br>100 | 250<br>125<br>62.5 | 100<br>94<br>90 | 250<br>125<br>62.5 | 100<br>98<br>100 | ---- | ---- |
| $nC_4H_9S-\overset{O}{\underset{O}{\overset{\parallel}{S}}}-\overset{Cl}{\underset{Cl}{\overset{|}{C}}}-\overset{Cl}{\underset{Cl}{\overset{|}{C}}}H$ | 250<br>125<br>62 | 99<br>94<br>50 | 250<br>125<br>62 | 97<br>97<br>90 | 250<br>125<br>62 | 97<br>97<br>90 | ---- | ---- |
| $CH_3S-\overset{O}{\underset{O}{\overset{\parallel}{S}}}-CCl_3$ | 250<br>125<br>62 | ---- | 250<br>135<br>62 | 96<br>48<br>30 | 250<br>125<br>62 | 80<br>10<br>7 | 250<br>125<br>62 | 49<br>30<br>2 |

To further illustrate the outstanding activity of the novel compounds, their effectiveness against spores were determined by means of "The Standard Spore Slide-Germination Method for Determining Fungicidal Activity" described in the American Phytopathological Society Journal, vol. 33, pages 627–632, 1943. As before, trichloromethyl methanethiolsulfonate was tested under identical conditions for comparative purposes.

The Spore Slide Method is designed to measure the fungitoxic activity of fungicidal chemicals, their activity being expressed in terms of percent inhibition of germination of fungus spores. Each compound to be tested was dissolved in acetone at a specified dilution. These solutions were then pipetted into the wells of depression slides and allowed to dry. The wells were filled with a spore suspension of the indicated test organism and incubated in a moist chamber overnight. A group of 100 spores was examined and the number of spores germinated and not germinated was counted and recorded to show the biological activity in terms of the percentage germination inhibition.

Table II reports the results of these tests on the particular fungus spores indicated.

est prior art compound. In every test the invention compounds were superior to trichloromethyl methanethiolsulfonate. At lower concentrations the invention compounds were dramatically superior in every instance.

Aside from the specific formulation and application of the class of compounds of the invention as represented by the foregoing tests, these compounds may be dispersed in or upon other inert liquid and solid carriers such as inert clay, xylenes, etc. These solid carriers may be in the form of a dust, or used in conjunction with a suitable wetting agent to form a wettable powder. Fungitoxic compounds of the invention may also be formulated with other solvents, dispersing agents, or emulsifying agent. Further, these compounds may not only be applied alone or in mixtures with other compounds of the disclosed class but may also be used in combination with other active toxicants in the formulation of fungicidal compositions.

The compounds may be applied to any environmental area which is a host to fungus or susceptible to fungus attack. For example, the fungicidal compositions may be sprayed or otherwise applied directly to a plant or other host, may be applied to the plant seed, sprayed upon the soil or other plant environment or used in similar ways so

TABLE II

| Compound | Monilinia Fructicola | | Alternaria Solani | | Glomerella Cingulata | | Botrytis Cinerea | |
|---|---|---|---|---|---|---|---|---|
| | P.p.m. | Control, Percent | P.p.m. | Control, Percent | P.p.m. | Control, Percent | P.p.m. | Control, Percent |
| $CH_3S-\overset{O}{\underset{O}{\overset{\parallel}{S}}}-\overset{Cl}{\underset{Cl}{\overset{|}{C}}}-\overset{Cl}{\underset{Cl}{\overset{|}{C}}}-H$ | 10<br>3<br>1.25 | 100<br>100<br>89 | 10<br>3<br>1 | 100<br>61<br>4 | 10<br>5<br>2.5 | 100<br>100<br>100 | 10<br>5<br>2.5 | 100<br>100<br>100 |
| $C_2H_5S-\overset{O}{\underset{O}{\overset{\parallel}{S}}}-\overset{Cl}{\underset{Cl}{\overset{|}{C}}}-\overset{Cl}{\underset{Cl}{\overset{|}{C}}}-H$ | 10<br>3<br>1 | 100<br>100<br>92 | 10<br>3<br>1 | 100<br>40<br>0 | ---- | ---- | ---- | ---- |
| $C_4H_9S-\overset{O}{\underset{O}{\overset{\parallel}{S}}}-\overset{Cl}{\underset{Cl}{\overset{|}{C}}}-\overset{Cl}{\underset{Cl}{\overset{|}{C}}}H$ | 10<br>3<br>1 | 100<br>100<br>100 | 10<br>3<br>1 | 100<br>61<br>0 | ---- | ---- | ---- | ---- |
| $CH_3S-\overset{O}{\underset{O}{\overset{\parallel}{S}}}-CCl_3$ | 10<br>3<br>1 | 3<br>0<br>0 | 10<br>3<br>1 | 2.4<br>0<br>0 | 10<br>5<br>2.5 | 7.2<br>0<br>0 | 10<br>5<br>2.5 | 3<br>0<br>0 | as to effect the control of fungus and fungus caused diseases.

Obviously, many modifications and variations of the invention as hereinabove set forth may be made without departing from the spirit and scope thereof; and, therefore, only such limitations should be imposed as are indicated in the appended claims.

I claim:
1. A compound having the formula:

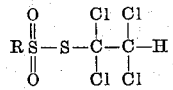

where R is non-tertiary alkyl of from 1 to 4 carbons.
2. 1,1,2,2-tetrachloroethyl methanethiolsulfonate.
3. 1,1,2,2-tetrachloroethyl ethanethiolsulfonate.
4. 1,1,2,2-tetrachloroethyl propanethiolsulfonate.
5. 1,1,2,2-tetrachloroethyl butanethiolsulfonate.

References Cited

UNITED STATES PATENTS

| 2,570,917 | 10/1951 | Colfee | 167—22 |
| 2,806,871 | 9/1957 | Gregory | 260—453 |
| 2,882,196 | 4/1959 | Lamb et al. | 167—22 |
| 3,145,226 | 7/1964 | Ratz | 260—453 |

CHARLES B. PARKER, *Primary Examiner.*

JULIAN S. LEVITT, JOSEPH P. BRUST, *Examiners.*

STANLEY J. FRIEDMAN, *Assistant Examiner.*